Patented Sept. 11, 1934

1,973,145

UNITED STATES PATENT OFFICE 1,973,145

METHOD OF MAKING MILK PRODUCTS

Rudolph Fluckiger, Riverside, Ill., assignor of three-fourths to George R. Farmer, Brookfield, Ill.

No Drawing. Application June 26, 1929, Serial No. 376,265

2 Claims. (Cl. 99—11)

My invention relates to a specially prepared milk food prepared from sweet whole cows' milk or from the milk serum from which the butterfat may have been extracted by the ordinary process of centrifugal separation, in which case in the manufacture of our improved milk food product the requisite amount of butterfat will be added to bring the butterfat content to the substantially normal condition of whole cows' milk which will ordinarily run from three and two-tenths per cent (3.2%) to four per, cent (4%) in butterfat content.

The primary object of my invention is to prepare an improved pasteurized milk for food purposes that is more digestible than ordinary untreated whole milk and which has a richer taste, and hence is more palatable by reason of its rich creamy taste, due to the thorough breaking up of the butterfat globules and a more thorough intermingling of the butterfat in the milk, the keeping qualities as well as the flavor of the same being also improved by reason of the destruction of bacteria normally found in comparatively fresh cows' milk and which, as is well known, has the capability, especially under favorable temperatures, of causing almost immediate changes in the flavor and quality of the same as a food product.

In practicing the invention I take sweet whole cows' milk having the normal butterfat content of approximately three and two-tenths per cent (3.2%) to four per cent (4%). This is preferably taken as fresh as possible but the process may be carried on advantageously on any whole cows' milk prior to the time that bacterial growth induces development of acidity to a point that would cause objectionable changes in the character of the milk such as the precipitation of casein and the like. Skim milk from a centrifugal separator that has been closely skimmed and which contains only a trace of butterfat may be advantageously used in making our improved milk food product, a normal amount of butterfat in the form of butter or rich cream being added to bring the average butterfat content to the normal amount of three and two-tenths per cent (3.2%) to four per cent (4%). When butterfat is added to skim milk in making the product, thorough mixing may take place by violent agitation, thus distributing the butterfat as evenly as possible through the mixture. Then the fresh whole milk or fresh skim milk enriched as described with butterfat should be warmed to approximately one hundred and fifteen degrees Fahrenheit (115° Fahr.).

After warming to one hundred and fifteen degrees Fahrenheit (115° Fahr.) the milk should then be passed through an homogenizing machine of the ordinary commercial type where it is submitted in the form of a jet under a high degree of pressure to a forcible impact that will thoroughly break up and emulsify the butterfat with the milk serum.

The homogenized material is then pasteurized by any of the well known pasteurizing processes that will give a prolonged definite period of treatment, the preferred temperature being from one hundred and forty-five degrees (145°) to one hundred and fifty degrees Fahrenheit (150° Fahr.), the milk being held in the pasteurizer at this temperature for not less than thirty minutes. After pasteurization the product is then cooled in any suitable cooling or refrigerating apparatus to a temperature of forty degrees (40°) Fahrenheit, after which it is in condition to be bottled or placed in other packaging or containing devices for distribution.

During distribution or from the time that the product leaves the cooling apparatus until it is ready for use by the customer it should be treated like other dairy food products, as for example, like ordinary whole milk as commonly sold for food and beverage purposes.

My improved milk food product treated as before described by reason of the successive homogenizing and pasteurizing steps is more digestible than ordinary whole cows' milk and has a decidedly richer and more agreeable taste by reason of the breaking up of the butterfat globules and the thorough emulsion and distribution of the same in the milk serum, due to the homogenizing step, the result being that the product has a decidedly rich creamy taste quite unexpected, as compared with the appearance and taste of ordinary whole cows' milk. Furthermore, our improved product not only has the taste and consistency vastly improved, but it has superior keeping qualities to ordinary whole cows' milk, due to the successive steps of homogenization followed by pasteurization that free the product from all pathogenic bacteria, and in fact, from practically all inherent bacteria that ordinarily cause comparatively rapid change and deterioration in the ordinary commercial whole milk, whether pasteurized or unpasteurized.

I have discovered that homogenizing whole milk before pasteurization has the effect of breaking up the butterfat globules and exposes the bacteria so that the succeeding step of pasteurizing is much more effective and the bacterial count may be reduced to the minimum by pasteurizing temperatures as specified that will not impart a cooked or caramelized flavor to the product, which is, as a result, much more nearly sterile than ordinary pasteurized milk. Furthermore, the product is homogeneous for an indefinite period and the butterfat or cream will not separate to form a cream line in the bottles or containers, as in the case of ordinary pasteurized whole milk.

My improved product may be used as a milk food product for any of the purposes for which rich cows' milk is ordinarily used.

The milk food product made in accordance with the teachings of my invention by reason of the described treatment of homogenization preferably followed by subsequent pasteurization, is found to have the improved quality of digestibility due to a definite lowering of the curd tension and disintegration of all hard curd of the treated product and my product has had a wide commercial use as an easily digestible invalid's food in hospitals and for the delicate stomachs of infants or very young children or very young animals or elderly persons or others whose digestion may be impaired.

In developing and perfecting my invention I have applied the same advantageously to large quantities of sweet, cow's milk of the ordinary run coming into the commercial dairy which is obviously as known to those skilled in the art an intermingling of the milks from various cows and usually an intermingling of milks from various herds.

I believe my invention to be adaptable and applicable and I have found it so when applied to all sweet whole milk whether in the condition as it comes from the cows or herds or whether it be reconstituted milk as herein described.

I have ascertained that by following my process as herein set forth that the digestibility and the food quality of the product is enhanced by the breaking up of the milk particles as the fat globules and the casein and other constituents suspended in the milk serum, well known to those skilled in the art, are thoroughly disintegrated as herein specified, thus producing a soft curd milk.

In practicing my invention as herein described, in the homogenizing process I have used an ordinary commercial homogenizer as well as an analogous machine referred to as a "viscolizer" and tests of my product made, as herein described, show that at the temperature set forth, the breaking up of the fat globules as described tends to finely distribute the fatty phase without causing precipitation or coagulation of protein or precipitation of the calcium constituents of the milk.

What I claim as my invention and desire to secure by Letters Patent is:

1. The process of treating milk having hard curd to reduce the curd tension thereof and enhance its digestibility for the infant stomach which comprises homogenizing milk with pressures sufficient to break up and finely distribute the fatty phase and at a temperature sufficient that the fat content may be subdivided but not sufficient to cause precipitation or coagulation of the protein or precipitation of the calcium, to produce a soft curd milk having a permanent and uniform curd tension below 45 grams.

2. The process of treating a milk mixture composed of milk from different cows or herds individually possessing varying degrees of curd hardness to reduce the curd tension thereof and enhance its digestibility for the infant stomach which comprises homogenizing the milk mixture with pressure sufficient to break up and finely distribute the fatty phase and a temperature sufficient that the fat content may be subdivided but not sufficient to cause precipiation or coagulation of the protein or precipitation of the calcium, to produce a soft curd milk having the permanent and uniform curd tension below 45 grams.

RUDOLPH FLUCKIGER.